US008684257B2

(12) United States Patent
Osborne et al.

(10) Patent No.: US 8,684,257 B2
(45) Date of Patent: Apr. 1, 2014

(54) ROTOR FOR ELECTRIC MOTOR AND BRAZING PROCESS

(75) Inventors: Richard J. Osborne, Shelby Township, MI (US); Qigui Wang, Rochester Hills, MI (US); Yucong Wang, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 312 days.

(21) Appl. No.: 13/209,588

(22) Filed: Aug. 15, 2011

(65) Prior Publication Data

US 2013/0043760 A1 Feb. 21, 2013

(51) Int. Cl.
*B23K 31/02* (2006.01)

(52) U.S. Cl.
USPC .......................................... 228/165; 228/246

(58) Field of Classification Search
None
See application file for complete search history.

(56) References Cited

U.S. PATENT DOCUMENTS

| | | | | |
|---|---|---|---|---|
| 3,902,087 | A * | 8/1975 | Hakamada et al. | 310/211 |
| 5,283,941 | A | 2/1994 | Meyer et al. | |
| 5,729,885 | A * | 3/1998 | Carosa et al. | 29/598 |
| 5,886,443 | A * | 3/1999 | Dymond et al. | 310/196 |
| 6,177,750 | B1 * | 1/2001 | Tompkin | 310/216.114 |
| 6,345,433 | B1 * | 2/2002 | Kliman et al. | 29/598 |
| 6,877,210 | B2 * | 4/2005 | Hsu | 29/598 |
| 2002/0153802 | A1 * | 10/2002 | Kliman et al. | 310/261 |
| 2003/0062786 | A1 * | 4/2003 | Reiter et al. | 310/156.08 |
| 2005/0073216 | A1 * | 4/2005 | Mitcham | 310/270 |
| 2007/0284953 | A1 | 12/2007 | Lyons et al. | |
| 2009/0079289 | A1 * | 3/2009 | Lang et al. | 310/214 |
| 2011/0254400 | A1 * | 10/2011 | Vallejo | 310/211 |
| 2012/0228985 | A1 * | 9/2012 | Hayahi et al. | 310/211 |
| 2013/0049516 | A1 * | 2/2013 | Kleber et al. | 310/211 |
| 2013/0049517 | A1 * | 2/2013 | Lang | 310/211 |
| 2013/0049518 | A1 * | 2/2013 | Kleber et al. | 310/211 |
| 2013/0127291 | A1 * | 5/2013 | Agapiou et al. | 310/211 |

FOREIGN PATENT DOCUMENTS

| | | | |
|---|---|---|---|
| EP | 744812 | A2 * | 11/1996 |
| IN | 187864 | B * | 7/2002 |
| JP | 10-150750 | A * | 6/1998 |
| JP | 11-146614 | A * | 5/1999 |
| JP | 2002-335659 | A * | 11/2002 |
| JP | 2004-254433 | A * | 9/2004 |
| JP | 2004-304930 | A * | 10/2004 |
| JP | 2005-261005 | A * | 9/2005 |

OTHER PUBLICATIONS

Machine translation of JP-2002-335659A (no date).*

* cited by examiner

*Primary Examiner* — Kiley Stoner

(57) ABSTRACT

A plurality of conductor bars are positioned within slots of a laminated electric steel disc stack, and the ends of the conductor bars are brazed to end rings to manufacture a rotor. The method includes inserting the conductor bars into the slots of the disc stack, providing the end rings with slots for receiving the ends of the conductor bars; positioning spacers of braze material adjacent each end of each of the conductor bars to create a gap between the end rings and the steel disc stack; and applying heat to melt the braze material of the spacers whereby braze material is furnished by the spacers of braze material to braze the first and second ends of the conductor bars to the first and second end rings. Channels are provided in the face of the end rings facing the steel disc stack to drain away excess braze material.

14 Claims, 2 Drawing Sheets

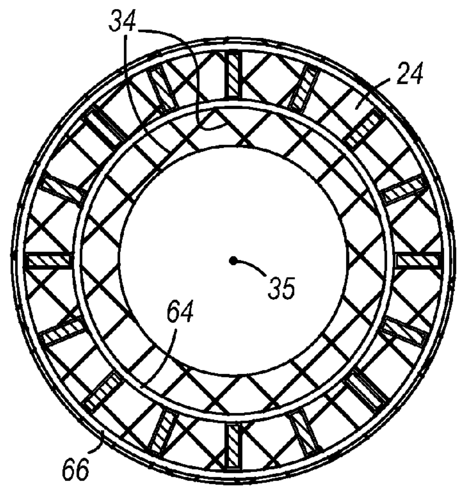
FIG. 4
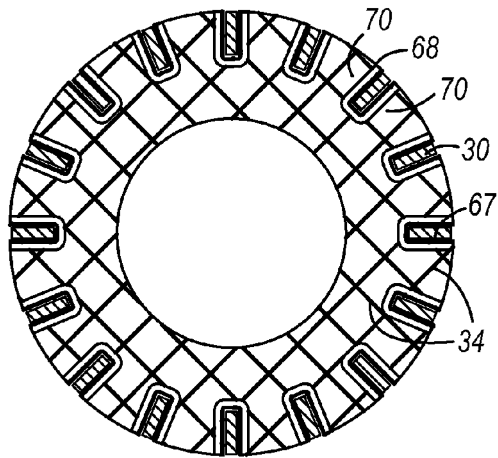
FIG. 5
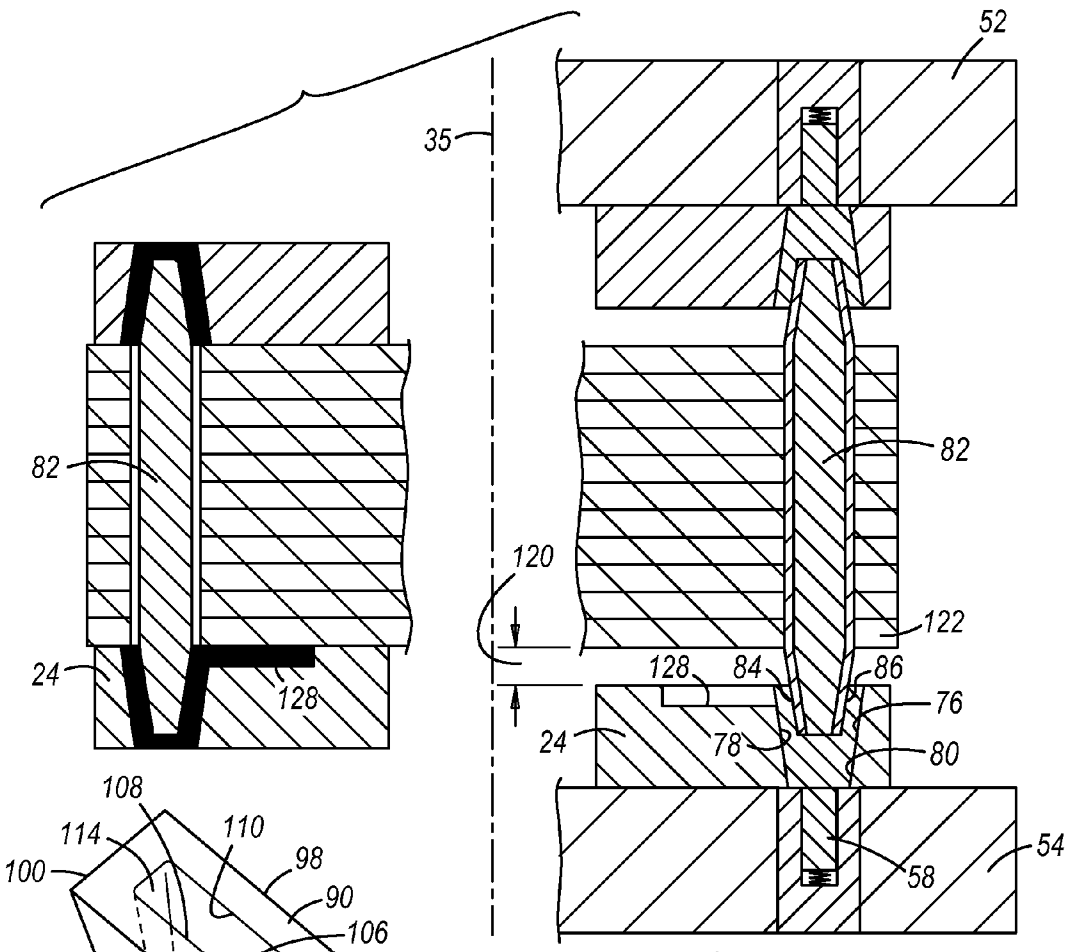
FIG. 6
FIG. 7

ROTOR FOR ELECTRIC MOTOR AND BRAZING PROCESS

The present invention relates to an improved rotor assembly and brazing process for attaching together the end rings and the conductor bars of the rotor assembly in an induction motor.

BACKGROUND OF THE INVENTION

Induction electric motors include a rotor assembly that rotates inside a stator. The rotor assembly is typically comprised of a number of round flat discs made of an electric steel material. These discs are arranged in a stack and sandwiched between first and second end rings. A rotor shaft extends through the end rings and the discs. A plurality of slots are provided in the discs adjacent the outer periphery thereof. A plurality of conductor bars extend through the aligned slots of the discs and first and second end rings, and the conductor bars are attached to the end rings by brazing.

It is desirable in the manufacture of the afore described rotor assemblies that the brazing of the conductor bars to the end rings be performed in a high-quality and efficient manner to assure high performance and reliability of the induction electric motor.

Accordingly it would be desirable to provide an improved rotor assembly and improved brazing process for attaching together the end rings and the conductor bars of the rotor assembly in an induction motor.

SUMMARY OF THE INVENTION

A method for brazing the first and second ends of a plurality of conductor bars positioned within slots of a laminated electric steel disc stack to first and second end rings to manufacture a rotor, comprising the steps of: inserting the conductor bars into the slots of the laminated electric steel core; providing the end rings with slots for receiving the ends of the conductor bars; positioning spacers of braze material adjacent each end of each of the conductor bars to create a gap between the end rings and the disc stack; and applying heat to melt the braze material of the spacers of braze material whereby braze material is furnished by the spacers of braze material to braze the first and second ends of the conductor bars to the first and second end rings. Channels are provided in the face of the end rings facing the steel disc stack to drain away excess braze material.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein:

FIG. 4 is a view similar to FIG. 2 but showing another embodiment of the invention.

FIG. 5 is a view similar to FIGS. 2 and 4 but showing yet another embodiment of the invention FIG. 6 is a view similar to FIG. 1 but showing a still further embodiment of the invention.

FIG. 7 is a perspective view showing the spacer of FIG. 6.

DETAILED DESCRIPTION OF THE EXEMPLARY EMBODIMENTS

The following description of certain exemplary embodiments is merely exemplary in nature and is not intended to limit the invention, its application, or uses.

Figure 1:
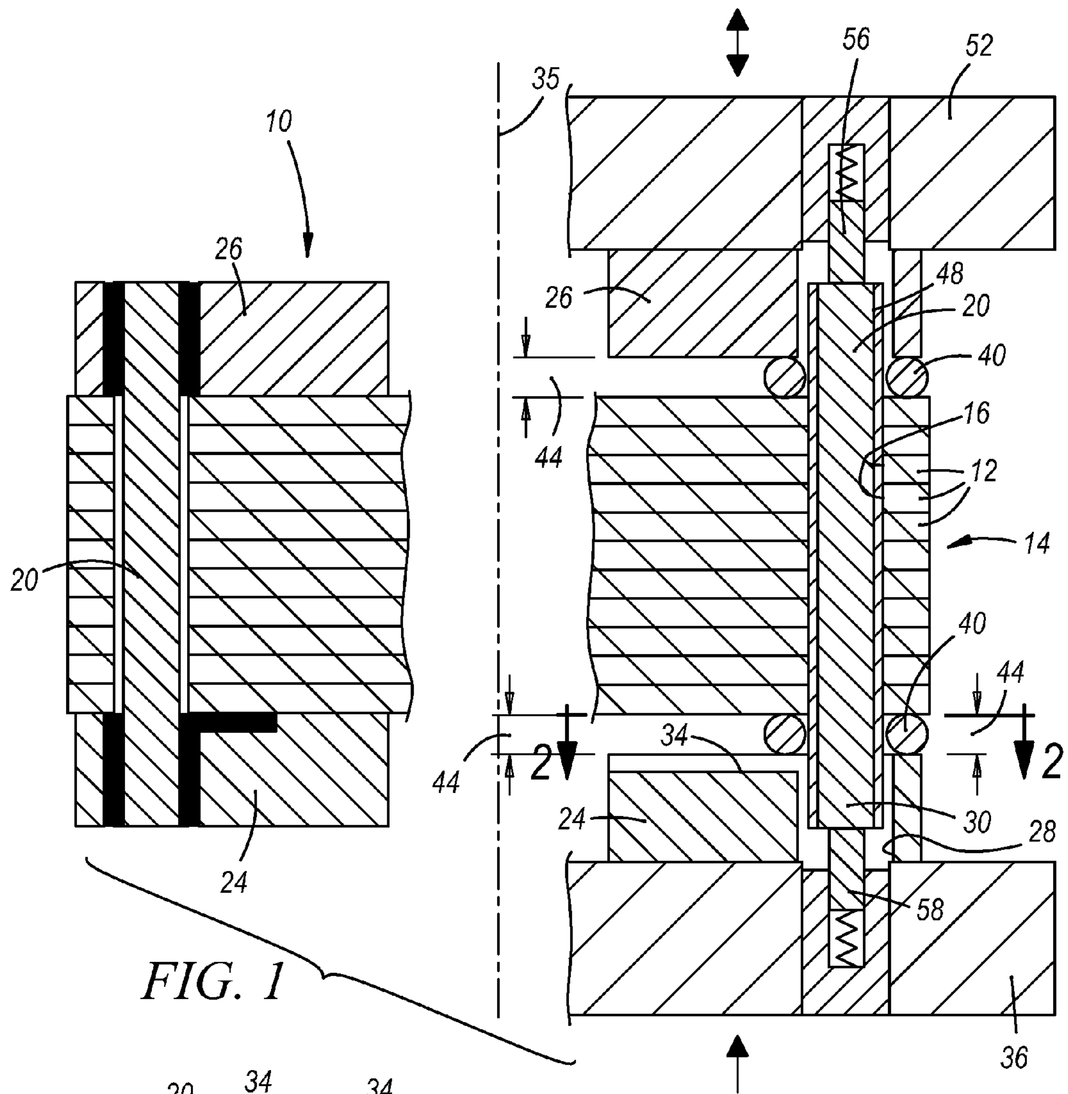
FIG. 1 is a section view taken through a rotor and showing the assembled rotor on the left-hand side and the method for brazing the rotor on the right-hand side.

Referring to FIG. 1, a rotor, generally indicated at 10, is provided for an induction electric motor. The left-hand side of FIG. 1 shows a section through the assembled rotor 10. The right-hand side of FIG. 1 shows the tools and method for assembling the rotor 10.

The rotor 10 is comprised generally of a plurality of round and flat electric steel discs 12 that are arranged in a disc stack, generally indicated at 14. Each of the discs 12 has a plurality of slots 16 provided therein. As seen in FIG. 1, when the discs 12 are arranged in the stack 14, these slots 16 align with one another so that each slot 16 can receive a conductor bar 20 as the conductor bars 20 are inserted through the slots 16.

Figure 2:
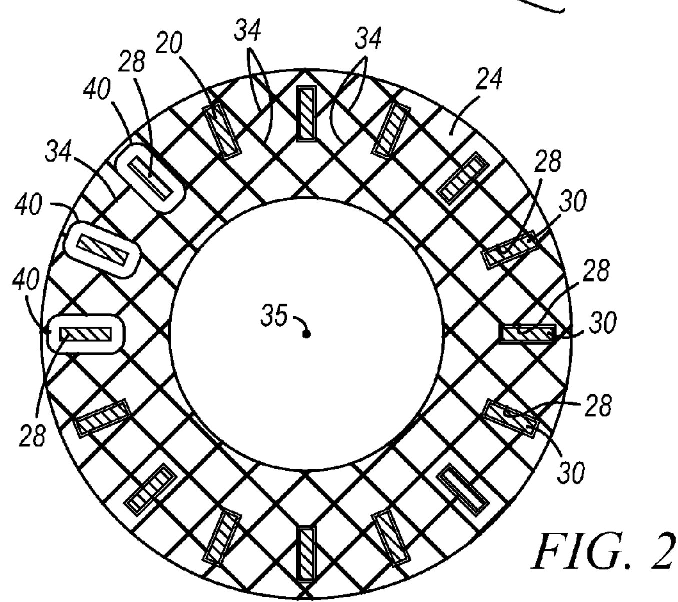
FIG. 2 is a plan view of the end ring taken in the direction of arrows 2-2 of FIG. 1.

As seen in FIGS. 1 and 2, the rotor 10 also includes a first or lower end ring 24 and a second or upper end ring 26. The end ring 24 is best shown in FIG. 2, and has a plurality of end slots 28 therein which will respectively align with the conductor bars 20 and will receive the ends 30 of the conductor bars 20. The slots 28 can extend all the way through the thickness of the end ring 24 as shown in FIG. 1, or can have a closed bottom (blind slot holes in the end rings). The conductor bars 20 are typically made of aluminum alloy or copper alloy, and can be cast or machined. Likewise the end rings 24 and 26 are made of either aluminum alloy or copper alloy, and can be cast or machined. In addition, as best seen in FIG. 2, the end rings 24 and 26 are provided with a plurality of grooves 34 that will be discussed further hereinafter. The grooves 34 can be made by coining, stamping, sawing, machining, casting, honing, or other manufacturing processes.

During assembly of the rotor 10, the conductor bars 20 are brazed to the end rings 24 and 26 by a brazing material so as to provide the finished rotor 10. In addition, though not shown in the drawings, it will be understood that the rotor 10 will also be provided with a shaft, not shown, by which the rotor 10 is mounted for rotation within the induction motor for rotation about an axis 35.

Figure 3:
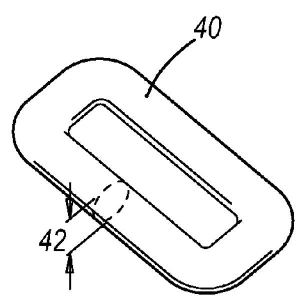
FIG. 3 is a perspective view of a spacer made of brazing material.

Referring now to the right-hand side of FIG. 1, the method of assembling and brazing the rotor 10 will be discussed. The lower end ring 24 is rested upon a lower tool plate 36. A spacer 40, of brazing material, is placed adjacent each of the slots 28 of the lower end ring 24. The spacer 40 may be a rectangular ring shape, as shown in FIG. 3, that will fit closely around the conductor bar 20 when the conductor bar 20 is inserted into the slot 28 of the end ring 24. Whatever the shape of the spacer 40, the spacer 40 will have a closely controlled height designated 42 in FIG. 3. The lowermost disc 12 of the stack 14 will rest upon the spacer 40, so that the spacer 40 will define a gap 44 between the end ring 24 and the lowermost disc 12. Thus, the height 42 of the spacer 40 will determine the height of the gap 44 between the end ring 24 and the lowermost disc 12. FIG. 1 also shows spacers 40 that are placed on the topmost disc 12 of the stack 14 so that the upper end ring 26 will be spaced apart from the uppermost disc 12 by a gap 44.

In addition to the brazing material that is provided by the spacers 40, the conductor bars 20 can be coated with a brazing material coating 48. This brazing material coating 48 can be a braze paste that is applied to the entire conductor bar 20 or only to the ends of the conductor bar 20, or this brazing material 48 can be a cladding that is extruded or otherwise coated onto the outside of the conductor bars 20. If needed, flux may be applied to the end rings or to the conductor bars.

As seen in FIG. 1, an upper tool plate 52 will be pressed against the upper end ring 26. The upper tool plate 52 mounts a heating element 56 that will move into contact with the end of each conductor bar 20. Likewise, the lower tool plate 36 mounts a heating element 58 that will move into contact with the lower end of each conductor bar 20. Upon heating of the conductor bars 20 by the heating elements 56 and 58, the spacers 40 of brazing material will be melted and the combination of gravity and capillary action will cause the melted brazing material of the spacers 40 to flow into the gap between the conductor bars 20 and the slots 28 of the end rings 24 and 26. During the melting of the spacers 40, the upper tool plate 52 will be pressing downwardly, either by gravity or by a hydraulic or mechanical force applied thereto, in order to press the upper end ring 26 onto the topmost disc 12 of the stack 14, and simultaneously press the stack 14 downwardly so that the lowermost disc 12 of the stack 14 is forced into contact with the end ring 24.

The spacers 40 are intentionally sized to produce at least a small excess volume of brazing material in order to ensure that sufficient brazing material is provided to obtain a highly reliable and high strength brazed joint between the ends 30 of the conductor bars 20 and the end rings 24 and 26. To the extent that excess brazing material is provided, that excess will flow into the grooves 34 that were provided in the faces of the lower end ring 24 and upper end ring 26. Referring again to FIG. 2 is seen that the grooves 34 for receiving the excess of brazing material are provided in the end ring 24 in a crosshatch pattern network having a footprint such that a groove 34 will be provided in communication which with the each of the slots 28 in order to assure that each of the slots 28 will have an assured overflow groove communicating there with to drain away the excess brazing material. In addition, the brazing material that was clad to the outside of the conductor bars 20 will also flow by gravity or capillary action to supplement the brazing material provided by the spacers 40, and any excess will overflow to the grooves 34.

Referring to FIG. 4, another embodiment of the invention is shown. As in FIG. 1 the lower plate 24 has slots 28 receiving the lower ends 30 of conductor bars 20. A network of grooves 34 is provided, similar to the grooves 34 of FIG. 2. In FIG. 4, the braze material is provided by an inner braze ring 64 and an outer braze ring. As seen in FIG. 4 the outer braze ring 66 has a larger diameter than the diameter of the inner braze ring 64 and encircles all of the conductor bars 20 closely adjacent the outer edges of the conductor bars. The inner braze ring 64 encircles all of the conductor bars 20 around the inner edges of the conductor bars 20. The inner braze ring 64 and outer braze ring 66 each have a thickness that will establish the gap 44 shown as was shown and discussed in relation to FIG. 1.

FIG. 5 is yet another embodiment of the invention showing another alternative for providing the brazing material. In FIG. 5, the slots for receiving the conductor bars 30 are slots 67 that are cut into the preferable peripheral edge face 68 of the lower end plate 24. The braze material is provided by a plurality of U-shaped spacers 70. As seen in FIG. 5, the spacers 70 surround the conductor bars 20 closely on three sides. Upon melting of the braze material of spacer 70, gravity and capillary action and also the pressure of the upper and lower tool plate 36 and 52 will distribute the melted brazing material. Excess brazing material will be received and drained away by the grooves 34.

Referring to FIGS. 6 and 7, another embodiment of the invention is shown. In FIG. 6 the lower end ring 24 has a plurality of slots 76 therein, and, as seen in FIG. 3, the slots 76 have inclined sidewalls 78 and 80. Conductor bars 82 each have tapered sidewalls 84 and 86 at the ends thereof. The angle of incline of the conductor bar tapered sidewalls 84 and 86 may be the same as the angle of incline of the slot sidewalls 78 and 80. Referring to FIG. 7, the spacer 90, of brazing material, is shown to be shaped like a bucket, having a bottom wall 94, tapered outer sidewalls 96 and 98, and end walls 100 and 102. The taper of the outer sidewalls 96 and 98 will match the taper of the walls 78 and 80 of the lower end ring 24. The inside of the spacer ring 90 is a cavity 106 defined by tapered inside sidewalls 108 and 110, and end walls 114 and 116. The taper of the inside sidewalls 108 and 110 will preferably match the taper of the tapered sidewalls 84 and 86 of the conductor bar 82. Alternatively, the bottom wall 94 can be omitted so that the bucket shape has an open bottom.

The right-hand side of FIG. 6 shows the components of the rotor positioned between upper tool plate 52 and lower tool plate 54. As seen in FIG. 6 the spacer 90 receives the lower end of the conductor bar 82 and creates a gap 120 between the lowermost disc 122 of the rotor stack and the face of the lower end plate 24. The lower tool plate 54 has a heating element 58 that engages with the bottom of the spacer 90. When heat is applied to the heating element 58, the spacer 90 of brazing material will be melted. Force applied to the upper tool plate 52 will cause the gap 120 to be eliminated as the end of the conductor bar 82 is inserted downwardly into the slots 76. The lower end plate 24 is provided with grooves 128 in order to carry away any excess of the melted brazing material. Accordingly, in the left-hand side of FIG. 6 the finished rotor is shown and it is seen that the melted braze material has now attached the ends of the conductor bars 82 to the lower end plate 24 and any excess brazing material has flowed into the channel 128.

Thus the invention provides an improved brazing process for attaching together the end rings and the conductor bars of the rotor assembly in an induction motor.

Although the drawings and description herein show several examples of a spacer made of brazing material, it will be understood that other shapes of brazing material can be employed to carry out the invention a method. For example, the spacer, rather than the various shape shown herein, could be one or more individual pieces of brazing material of alternative shapes that would be positioned between the stack of discs and the end rings to become melted and provide the small excess volume of brazing material.

In addition, although the drawings and description herein give the example of a network of grooves 34 that are machined, cast, stamped, honed, or coined into the surface of the end ring, it will be understood that the end rings could alternatively be manufactured to have a surface roughness or texture that would provide an integral and random channel network for draining away the excess of brazing material.

What is claimed is:

1. A method for brazing the first and the second ends of a plurality of conductor bars positioned within slots of a laminated steel disc stack to the first and the second end rings to manufacture a rotor, comprising the steps of:

inserting the conductor bars into the slots of the disc stack;

providing the end rings with slots for receiving the ends of the conductor bars;

positioning spacers of braze material adjacent each end of each of the conductor bars to create a gap between the end rings and the disc stack, the spacers each being a bucket shaped spacer interposed between the end of each conductor bar and the adjacent end ring;

and applying heat to melt the braze material of the spacers of braze material whereby braze material is furnished by the spacers of braze material to braze the first and the second ends of the conductor bars to the first and the second end rings.

2. The method of claim 1 further comprising applying pressure to the end rings to force the end rings together so the gap between the end rings and the disc stack is eliminated as the spacers of braze material are melted.

3. The method of claim 1 further comprising providing the end rings with channels formed in a surface thereof facing toward the disc stack, said channels receiving a flow of excess brazing material that is not needed to braze the first and second ends of the conductor bars to the first and second end rings.

4. The method of claim 1 further comprising the slot in the end rings, and the ends of the conductor bars, and the bucket shape spacer each having tapered walls that interface with one another to cooperatively establish the gap between the end rings and the disc stack.

5. The method of claim 1 further comprising the spacers being sized to provide an excess volume of brazing material beyond the volume of brazing material needed to braze the first and second ends of the conductor bars to the first and second end rings, said end rings having channels formed in a surface thereof facing toward the disc stack to receive the flow of excess brazing material, and said channels receiving a flow of excess brazing material that is not needed to braze the first and second ends of the conductor bars to the first and second end rings.

6. The method of claim 1 further comprising the spacers being sized to provide an excess volume of brazing material beyond the volume of brazing material needed to braze the first and second ends of the conductor bars to the first and second end rings, the method including applying pressure to the end rings to force the end rings together so the gap between the end ring and the disc stack is eliminated as the spacers of braze material are melted, and said end rings having channels formed in a surface thereof facing toward the disc stack to receive the flow of excess brazing material.

7. A method for brazing the first and second ends of a plurality of conductor bars positioned within slots of a laminated steel disc stack to the first and the second end rings to manufacture a rotor, comprising the steps of:

coating the conductor bars with a braze material;

inserting the conductor bars into the slots of the disc stack;

providing the end rings with slots for receiving the ends of the conductor bars;

installing spacers of braze material between each of the first and the second end rings and the ends of the conductor bars to create a gap between the end rings and the disc stack, each of the spacers being a bucket shape spacer interposed between the end of each conductor bar and the adjacent end ring to create a space between the disk stack and the end ring;

and applying heat to melt the braze material coating the conductor bars and the spacers of braze material whereby braze material is furnished by both the braze material coating and the spacers of braze material to braze the first and second ends of the conductor bars to the first and second end rings.

8. The method of claim 7 further comprising applying pressure to the end rings to force the end rings together so the gap between the end ring and the laminated steel disc stack is eliminated as the spacers of braze material are melted.

9. The method of claim 7 further comprising providing the end rings with channels formed in a surface thereof facing toward the disc stack, said channels receiving a flow of excess brazing material that is not needed to braze the first and second ends of the conductor bars to the first and second end rings.

10. The method of claim 7 further comprising the slot in the end rings, the ends of the conductor bars, and the bucket shape spacer each having tapered walls that interface with one another to cooperatively establish the gap between the end rings and the disc stack.

11. The method of claim 7 further comprising the spacers being sized to provide an excess volume of brazing material beyond the volume of brazing material needed to braze the first and second ends of the conductor bars to the first and second end rings, said end rings having channels formed in a surface thereof facing toward the disc stack to receive the flow of excess brazing material, and said channels receiving a flow of excess brazing material that is not needed to braze the first and second ends of the conductor bars to the first and second end rings.

12. The method of claim 7 further comprising the spacers being sized to provide an excess volume of brazing material beyond the volume of brazing material needed to braze the first and second ends of the conductor bars to the first and second end rings, the method including applying pressure to the end rings to force the end rings together so the gap between the end ring and the disc stack is eliminated as the spacers of braze material are melted, and said end rings having channels formed in a surface thereof facing toward the disc stack to receive the flow of excess brazing material.

13. The method of claim 1 further comprising the slot in the end rings, the ends of the conductor bars, and the bucket shape spacer each having tapered walls that interface with one another to cooperatively establish the gap between the end rings and the disc stack; and the spacers being sized to provide and excess volume of brazing material beyond the volume of brazing material needed to braze the first and second ends of the conductor bars to the first and second end rings, said end rings having channels formed in a surface thereof facing toward the disc stack to receive the flow of excess brazing material, and said channels receiving a flow of excess brazing material that is not needed to braze the first and second ends of the conductor bars to the first and second ends rings.

14. The method of claim 1 further comprising the slot in the end rings, the ends of the conductor bars, and the bucket shape spacer each having tapered walls that interface with one another to cooperatively establish the gap between the end rings and the disc stack; and the spacers being sized to provide an excess volume of brazing material beyond the volume of brazing material needed to braze the first and second ends of the conductor bars to the first and second end rings, the method including applying pressure to the end rings to force the end rings together so the gap between the end ring and the disc stack is eliminated as the spacers of braze material are melted, and said end rings having channels formed in a surface thereof facing toward the disc stack to receive the flow of excess brazing material.

* * * * *